United States Patent
Midani et al.

(10) Patent No.: US 9,100,448 B2
(45) Date of Patent: Aug. 4, 2015

(54) COMMUNICATION DEVICE FOR THROTTLING TRANSMITTED DATA

(75) Inventors: Wael Midani, Kitchener (CA); Ling Zou, Kitchener (CA); Marcel Villaflor, Kotonah, NY (US)

(73) Assignee: BlackBerry Limited, Waterloo, Ontario (CA)

(*) Notice: Subject to any disclaimer, the term of this patent is extended or adjusted under 35 U.S.C. 154(b) by 137 days.

(21) Appl. No.: 13/355,300

(22) Filed: Jan. 20, 2012

(65) Prior Publication Data

US 2013/0188485 A1    Jul. 25, 2013

(51) Int. Cl.
*G01R 31/08* (2006.01)
*H04L 29/08* (2006.01)
*H04L 12/873* (2013.01)
*H04L 12/863* (2013.01)

(52) U.S. Cl.
CPC .......... *H04L 67/2804* (2013.01); *H04L 47/527* (2013.01); *H04L 47/6215* (2013.01)

(58) Field of Classification Search
USPC ................................................ 370/235, 252
See application file for complete search history.

(56) References Cited

U.S. PATENT DOCUMENTS

| | | | |
|---|---|---|---|
| 7,602,721 B1 | 10/2009 | Tangirala et al. | |
| 7,826,358 B2 * | 11/2010 | Caram | 370/230 |
| 7,898,969 B2 | 3/2011 | Stephen | |
| 8,432,798 B2 * | 4/2013 | Kovacs | 370/230 |
| 2003/0097461 A1 * | 5/2003 | Barham et al. | 709/235 |
| 2003/0231593 A1 * | 12/2003 | Bauman et al. | 370/235 |
| 2004/0062259 A1 | 4/2004 | Jeffries et al. | |
| 2004/0143663 A1 * | 7/2004 | Leedom et al. | 709/226 |
| 2007/0014276 A1 * | 1/2007 | Bettink et al. | 370/351 |
| 2007/0016688 A1 * | 1/2007 | Hester et al. | 709/238 |
| 2007/0174883 A1 | 7/2007 | McEnroe et al. | |
| 2007/0180112 A1 | 8/2007 | McEnroe et al. | |
| 2008/0025214 A1 | 1/2008 | Bettink et al. | |
| 2010/0085874 A1 | 4/2010 | Noy et al. | |
| 2010/0146512 A1 | 6/2010 | Chen et al. | |
| 2011/0083175 A1 | 4/2011 | Bharrat et al. | |
| 2012/0195209 A1 * | 8/2012 | Jain et al. | 370/252 |
| 2012/0195324 A1 * | 8/2012 | Raghuraman et al. | 370/431 |

OTHER PUBLICATIONS

The Canadian Wireless Industry, Analysis Positioning and Capabilities, 2006-09, Kazam, 1-36.*
Extended European Search report mailed Apr. 26, 2012, in corresponding application No. 12151916.9.

* cited by examiner

*Primary Examiner* — Omar Ghowrwal
*Assistant Examiner* — Angel Brockman
(74) *Attorney, Agent, or Firm* — Fish & Richardson P.C.

(57) ABSTRACT

A communication device and method for throttling transmitted data is provided. Token parameters of an aggregate token bucket, associated with a communication application, are distributed, at a processing unit, to respective application token buckets associated with at least two further applications. The communication application is enabled to receive respective data from the at least two further applications for transmission to a network via a communication interfaces. The respective data received from the at least two further applications is throttled via the respective application token buckets.

19 Claims, 13 Drawing Sheets

Time Of Day Distribution factor "D" calculation
1. Collect hourly usage data for communications application, third party application usage global population
2. Determine mean usage for sample period (week, month)
3. Set D=1 at mean usage value. Calculate D value for each hourly interval Assumptions –  Sample Period Mean=0.80MB ➔ D=1
Calculated mean usage at hour "2Mon"=1.60MB D2Mon = 1.60/0.80 = 2.0

Fig. 11

COMMUNICATION DEVICE FOR THROTTLING TRANSMITTED DATA

FIELD

The specification relates generally to communication devices, and specifically to a communication device for throttling transmitted data and a method therefor.

BACKGROUND

The evolution of computers is currently quite active in the mobile device environment. It is known to use token buckets to throttle data transmitted from mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 11 depicts a method f determining time of day (TOD) distribution/scaling factors, according to non-limiting implementations.

DETAILED DESCRIPTION

Figure 1:
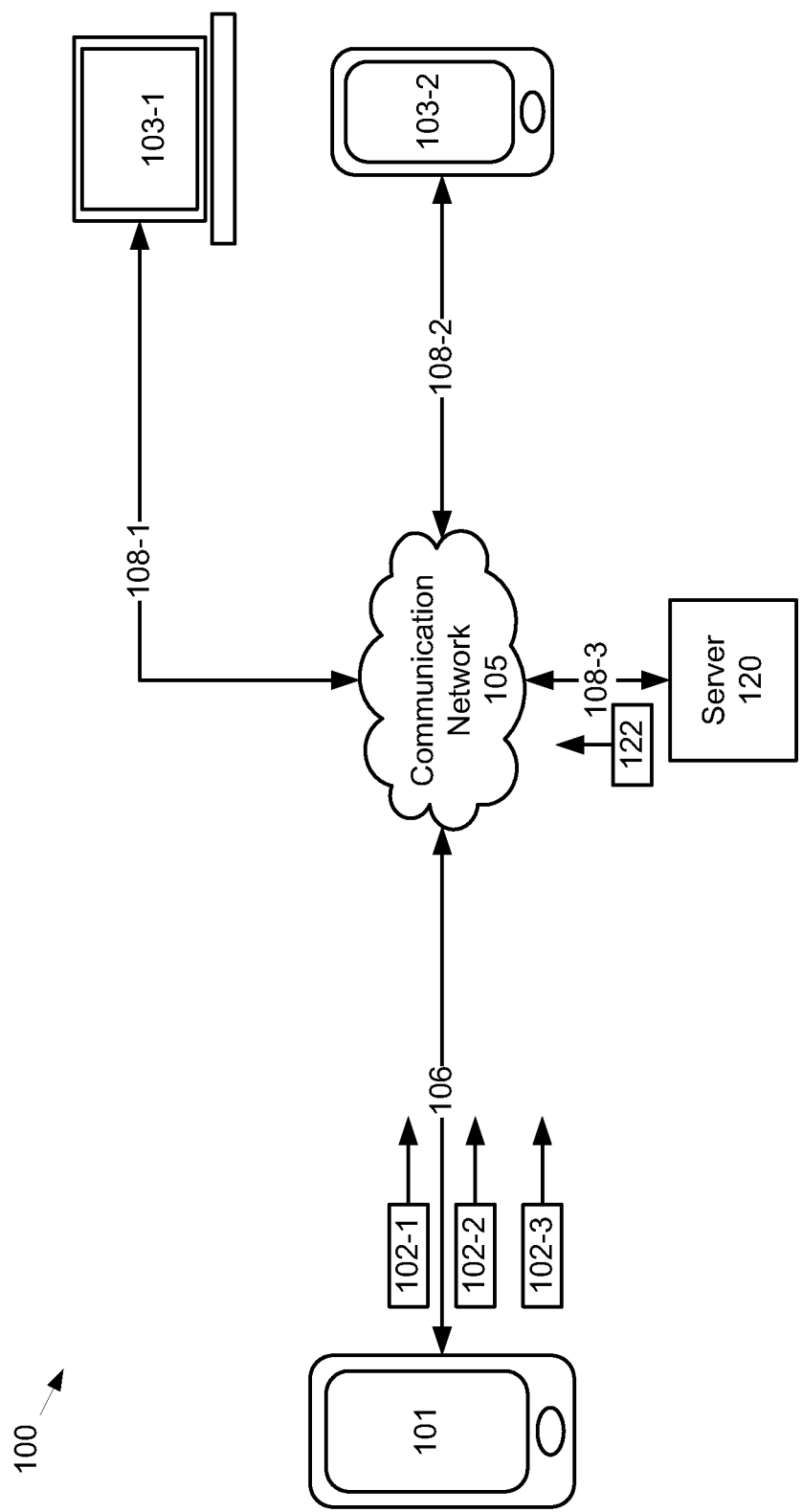
FIG. 1 depicts a system for throttling transmitted data at a communication device, according to non-limiting implementations.

An aspect of the specification provides a communication device comprising: a processor, and a communication interface, the processor enabled to: distribute token parameters of an aggregate token bucket, associated with a communication application, to respective application token buckets associated with at least two further applications, the communication application enabled to receive respective data from the at least two further applications for transmission to a network via the communication interface; and, throttle the respective data received from the at least two further applications via the respective application token buckets.

The processor can be further enabled to: determine respective weights associated with each of the respective application token buckets, such that the token parameters associated with the aggregate token bucket are distributed to each of the respective application token buckets according to the respective weights.

Each of the respective weights can be determined from respective data rates associated with each of the at least two further applications.

The processor can be further enabled to redistribute the distributed token parameters among the respective application token buckets associated with active applications when at least one of: one or more of the at least two further applications becomes inactive; and one or more additional further applications become active.

The token parameters can comprise: a maximum token bucket size for controlling bursts of the data; and a refresh rate, wherein respective maximum token buckets sizes and respective refresh rates are determined for each of the respective application token buckets such that a respective maximum token bucket size sum is approximately the maximum token bucket size, and a respective refresh rate sum is approximately the refresh rate.

The token bucket parameters can be scaled periodically according to scaling data received from a remote computing device. The scaling data can comprise time of day network usage probabilities. The scaling data can be based on historical network usage. The scaling data can be one of: for a plurality of communication devices, including the communication device, such that transmitted data is similarly scaled for each of the plurality of devices; and, specific to the communication device such that transmission of the data at the communication device is scaled independent of the other of the plurality of devices, At least one set of respective token parameters can be associated with a respective application token bucket is adjusted according to respective scaling parameters received from a remote computing device.

Another aspect of the specification provides a method comprising: distributing, at a processor of a computing device, token parameters of an aggregate token bucket, associated with a communication application processed by the processor, to respective application token buckets associated with at least two further applications, the communication application enabled to receive respective data from the at least two further applications for transmission to a network via a communication interface of the computing device; and, throttling, at a processor, the respective data received from the at least two further applications via the respective application token buckets.

The method can further comprise: determining, at the processor, respective weights associated with each of the respective application token buckets, such that the token parameters associated with the aggregate token bucket are distributed to each of the respective application token buckets according to the respective weights. Each of the respective weights can be determined from respective data rates associated with each of the at least two further applications.

The method can further comprise redistributing, at the processor, the distributed token parameters among the respective application token buckets associated with active applications when at least one of: one or more of the at least two further applications becomes inactive; and one or more additional further applications become active.

The token parameters can comprise: a maximum token bucket size for controlling bursts of the data; and a refresh rate, wherein respective maximum token buckets sizes and respective refresh rates are determined for each of the respective application token buckets such that a respective maximum token bucket size sum is approximately the maximum token bucket size, and a respective refresh rate sum is approximately the refresh rate.

The token bucket parameters can be scaled periodically according to scaling data received from a remote computing device.

The scaling data can comprise time of day network usage probabilities.

The scaling data can be based on historical network usage.

The scaling data can be one of: for a plurality of communication devices, including the communication device, such that transmitted data is similarly scaled for each of the plurality of devices; and, specific to the communication device such that transmission of the data at the communication device is scaled independent of the other of the plurality of devices, At least one set of respective token parameters can be associated with a respective application token bucket is adjusted according to respective scaling parameters received from a remote computing device.

Yet a further aspect of the specification provides a computer program product, comprising a computer usable medium having a computer readable program code adapted to be executed to implement a method comprising: distributing, at a processor of a computing device, token parameters of an aggregate token bucket, associated with a communication application processed by the processor, to respective application token buckets associated with at least two further applications, the communication application enabled to receive respective data from the at least two further applications for transmission to a network via a communication interface of the computing device; and, throttling, at a processor, the respective data received from the at least two further applications via the respective application token buckets.

FIG. 1 depicts a system 100 comprising a communication device 101 enabled to transmit data 102-1, 102-2, 102-3 with one or more of a plurality of remote communication devices 103-1, 103-2 via a communication network 105 (also referred to hereafter as network 105), according to non-limiting implementations. Communication device 101 will be also referred to hereafter as device 101, and plurality of remote communication devices 103-1, 103-2 will also be referred to hereafter generically as a device 103, and collectively as devices 103. This convention will be used elsewhere in the present specification. Each of device 101 and device 103 are linked to communication network 105 via a respective link 106, 108-1, 108-2. It is appreciated that, in some implementations, the bandwidth of network 105 and/or link 106 (and/or links 108) can be limited. In other implementations, device 101 can be authorized to use only a given amount of bandwidth. In any event, it is appreciated that, in present implementations, data 102 is to be throttled, as will be explained below. System 100 further comprises a server 120 for providing token parameters 122 to device 101 linked to communication network 105 via link 108-3.

Device 101 can be any type of electronic device that can be used in a self-contained manner and to interact with network 105 via link 106. Interaction includes displaying of information at device 101 as well as to receive input at device 101 that can in turn be sent one or more of devices 103 via link 106.

It is hence appreciated that device 101 comprises any suitable communication device for communicating with network 105, including but not limited to any suitable combination of computing devices, personal computers, laptop computers, portable electronic devices, mobile computing device, portable computing devices, tablet computing devices, laptop computing devices, PDAs (personal digital assistants), cellphones, smartphones and the like. Other suitable communication devices are within the scope of present implementations.

Each device 103 can be similar to or different from device 101 and can include but are limited to any suitable combination of computing devices, personal computers, laptop computers, portable electronic devices, mobile computing device, portable computing devices, tablet computing devices, laptop computing devices, PDAs (personal digital assistants), cellphones, smartphones and the like. Other suitable communication devices are within the scope of present implementations. Further, while two devices 103 are depicted in FIG. 1, it is appreciated that system 100 can comprise any suitable number of devices 103, which can be more or less than two.

Each link 106, 108 comprises any suitable link with network 105, including any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

Network 105 can comprise any suitable combination of wired and/or wireless networks as desired, including but not limited to the Internet, the PSTN (public switched telephone network), analog networks, packet switched networks, WiFi networks, WiMax networks, and the like.

Server 120 can be based on any well-known server environment including a module that houses one or more central processing units, volatile memory (e.g. random access memory), persistent memory (e.g. hard disk devices) and network interfaces to allow server 120 to communicate over link 108-2. For example, server 120 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 120 are contemplated. It is further more appreciated that server 120 can comprise any suitable number of servers that can perform different functionality of server implementations described herein. Functionality of server 120 will be described in further detail below.

Figure 2:
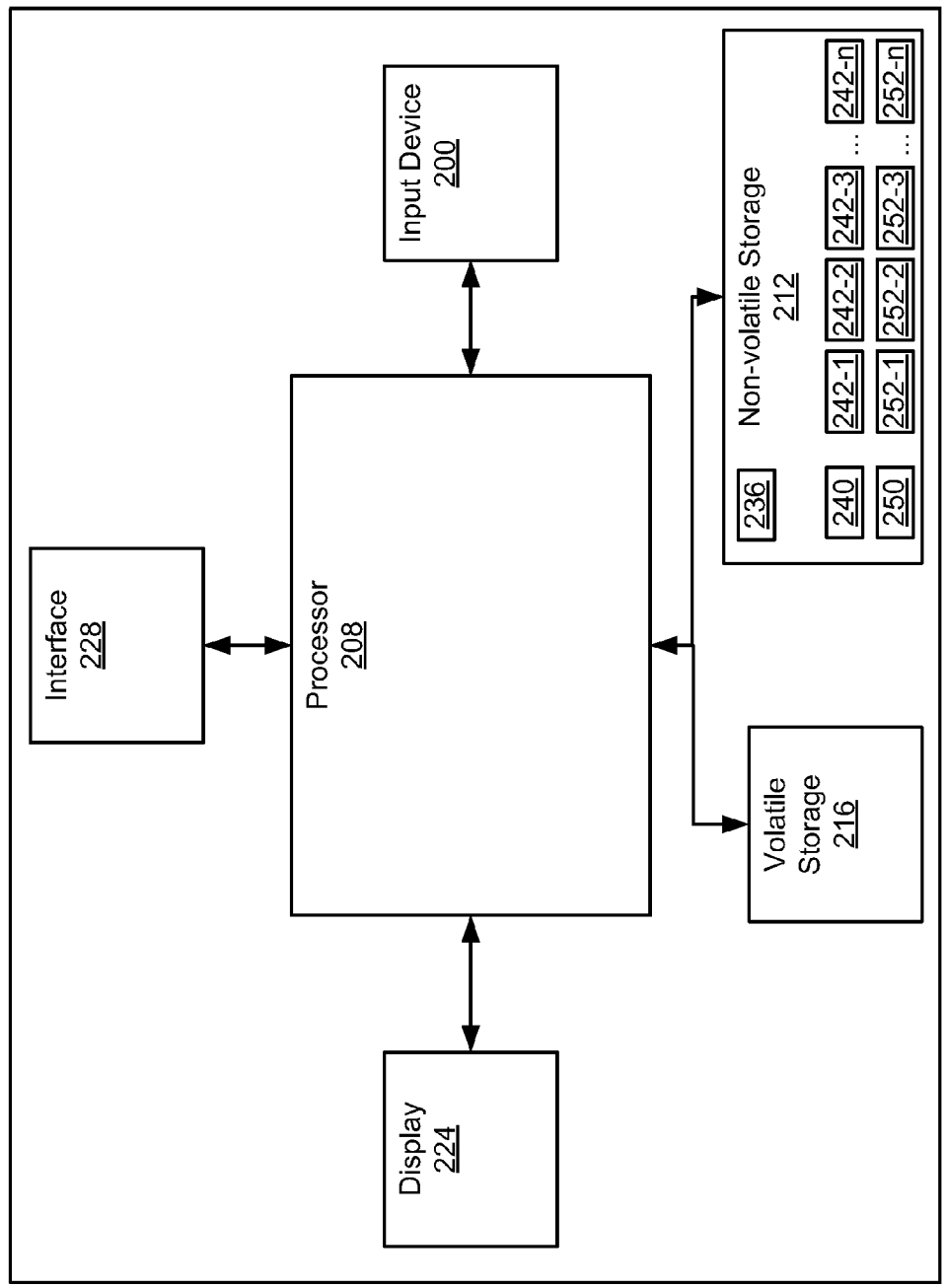
FIG. 2 depicts a communication device for throttling transmitted data, according to non-limiting implementations.

Attention is directed to FIG. 2, which depicts a schematic diagram of device 101 according to non-limiting implementations. It should be emphasized that the structure in FIG. 2 is purely exemplary, and contemplates a device that can be used for both wireless voice (e.g. telephony) and wireless data (e.g. email, web browsing, text) communications. Device 101 comprises at least one input device 200 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 200 is received at processor 208 (which can be implemented as a plurality of processors). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 101 as described herein are typically maintained, persistently, in non-volatile storage unit 212 and used by processor 208 which makes appropriate utilization of volatile storage 216 during the execution of such programming instructions. Those skilled in the art will now recognize that non-volatile storage unit 212 and volatile storage 216 are examples of computer readable media that can store programming instructions executable on processor 208. Furthermore, non-volatile storage unit 212 and volatile storage 216 are also examples of memory units and/or memory modules.

Processor 208 in turn can also be configured to a display 224 and optionally a speaker. Display 224 comprises any suitable one of or combination of CRT (cathode ray tube) and/or flat panel displays (e.g. LCD (liquid crystal display), plasma, OLED (organic light emitting diode), capacitive or resistive touchscreens, and the like).

In some implementations, input device 200 and display 224 are external to device 101, with processor 208 in communication with each of input device 200 and display 224 via a suitable connection and/or link.

Processor 208 also connects to a network communication interface 228, which can be implemented in some implementations as radios configured to communicate over respective links. In general, it will be understood that interface 228 is configured to correspond with the network architecture that is used to implement link 106. In other implementations a plurality of links with different protocols can be employed and thus interface 228 can comprise a plurality of interfaces to support each link. It should be understood that in general a wide variety of configurations for device 101 are contemplated.

In particular, non-volatile storage unit 212 can store an application 236 for throttling transmission of data to network 105, which can be processed by processor 208. For example, non-volatile storage unit 212 also stores a communication application 240 and a plurality of further applications 242-1, 242-2, 242-3 . . . 242-n. Non-volatile storage unit 212 further stores an aggregate token bucket 250 associated with communication application 240, and respective application token buckets 252-1, 252-2, 252-3 . . . 252-n associated with respective further applications 242-1, 242-2, 242-3 . . . 242-n. It is further appreciated that while four applications 242 are depicted in FIG. 2, any suitable number of applications 242 can be stored at device 101, and can be more or less than four.

It is appreciated that each of applications 240, 242 and token buckets 250, 252 can be processed by processor 208 along with application 236 to throttle data from device 101.

Figure 3:
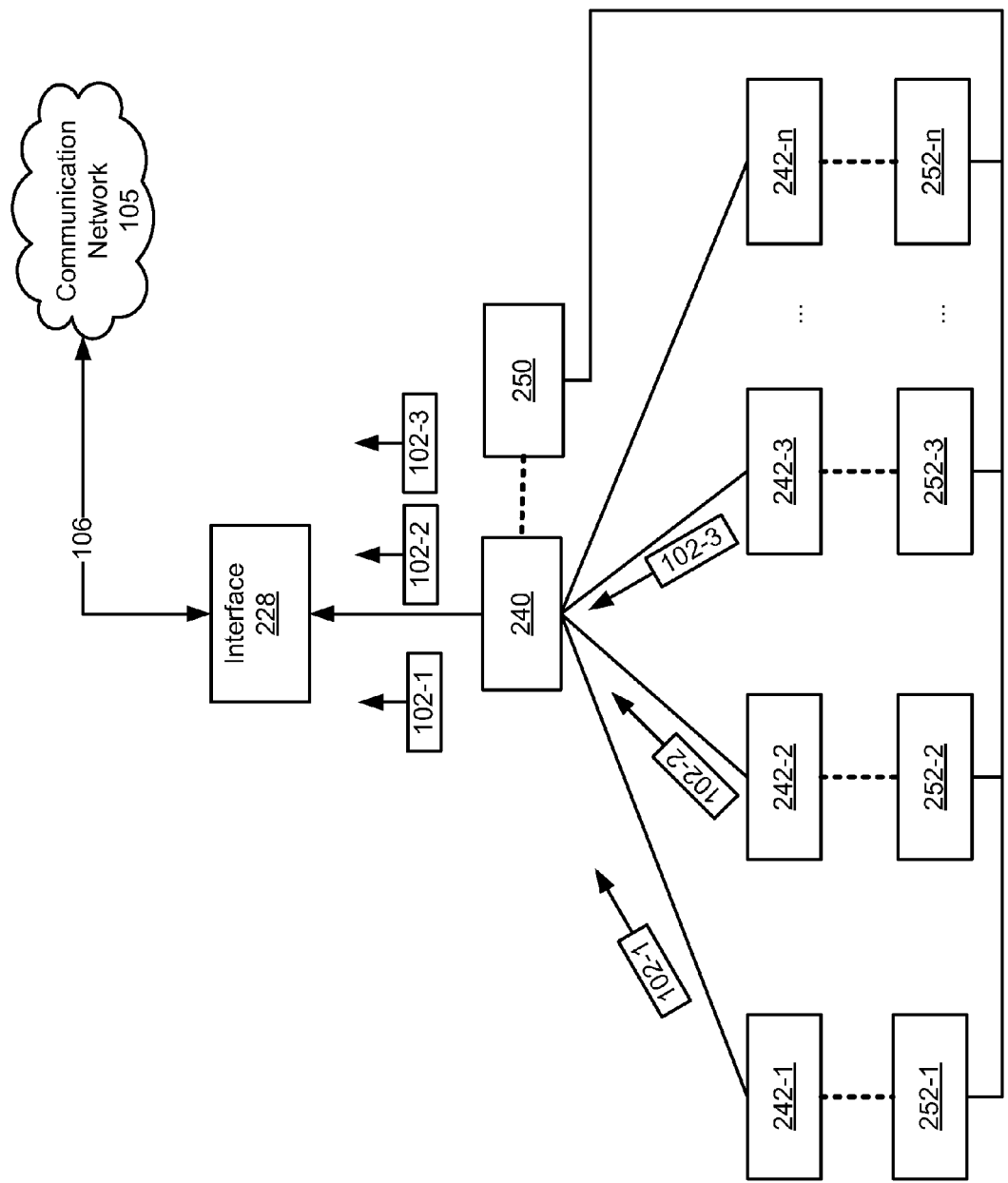
FIG. 3 depicts applications and token buckets of the communication device of FIG. 2, according to non-limiting implementations.

For example, attention is directed to FIG. 3 which depicts a schematic diagram of relationships between applications 240, 242, and when processed by processor 208, as well relationships between application 240 and interface 228. Specifically, application 240 comprises a communication application that transmits data 102 to network 105 via interface 228. In some non-limiting implementations, application 240 can comprise a messaging application, including but not limited to chat applications; indeed, it is appreciated that while messaging and/or chat applications are nominally used to transmit and receive text data, such messaging and/or chat applications can be enabled to transmit and receive any other type of suitable data, such as multimedia data, video data, music data, image data, and the like, as well as any suitable file transfer data, including but not limited to a URL link.

Each of Application 242 can comprise any suitable application for generating and/or processing data 102, including but not limited to multimedia data, video data, music data, image data and the like, though it is appreciated that any type of suitable data is within the scope of present implementations. However, applications 242 are generally appreciated to have limited or no messaging functionality. Hence, in present implementations, applications 240, 242 can be enabled to interact with each other such that data generated at one or more of applications 242 can be transmitted to network 105 via application 240.

It is also appreciated that one or more of applications 242 can comprise an application associated with application 240. For example, application 242-1 can comprise an application for generating message data and/or chat data while application 240 can comprise an associated client for transmitting data generated by application 242-1.

It is further appreciated that only a given number of applications 242 can be active at any given time. Further, active applications 242 can become inactive, while inactive applications 242 can become active, for example by respectively closing and opening given applications 242. In example implementations depicted in FIG. 3, it is appreciated that only three applications 242-1, 242-2, 242-3 are active and generating data 102-1, 102-2, 102-3 which are received at application 240 and transmitted to network 105 via interface 228. However, any of the inactive applications 242 can become active at any time and/or any of active applications 242 can become inactive at any given time.

In any event, it is appreciated that with the wide availability and increase in popularity of media rich bandwidth intensive applications the load on networks including but not limited to carrier networks, is growing exponentially. With the deployment of more social applications, many of which become viral in a very short time, pressure is growing on service providers and/or network operators to maintain good user experience, however it is appreciated that many service providers and/or network operators also need to control the amount of data throughput devices can push through a network, keeping network expansion costs under control and within budget while keeping user experience high. Such control of data is also needed to control rogue users and/or applications to prevents them from flooding networks, potentially degrading the user experience.

Hence, token buckets 250, 252 are provided; aggregate token bucket 250 throttle data transmission from application 240, while application token buckets 252 throttles transmission of data from respective applications 242. The associations between each token bucket 250, 252 and its respective application 240, 242 are depicted in FIG. 3 via stippled lines there between.

However, it is also appreciated that in present implementations, there is a relationship between aggregate token bucket 250 and application token buckets 252. For example, aggregate token bucket 250 can be provided with token parameters 122 for throttling transmission of data from device 101. For example, token parameters 122 can be provided to device 101 from server 120: in these implementations, server 120 is associated with a service provider and/or network operator which determines token parameters 122 for device 101, and indeed determines respective token parameters for each device associated with the service provider and/or network operator; in some implementations, the token parameters can be the same for each device associated with the service provider and/or network operator, however it is appreciated that token parameters can be determined on a device by device basis.

Non-limiting examples of token parameters can include but are not limited to a maximum token bucket size, also referred to hereafter as TB size, and a token bucket refresh rate, also referred to hereafter as refresh rate. In non-limiting examples, TB size comprises a maximum amount of data that can be transmitted by application 240, for example 1000 kB (kilobytes); and the refresh rate can comprise a rate at which token bucket 250 is refreshed, for example 100 kB/minute (kBm). Using these parameters, the initial size of token bucket 250 is 1000 kB, such that application 240 can transmit up to 1000 kB without restriction, and the token bucket 250 is refreshed at a rate of 100 kBm. Hence, application 240 can transmit bursts of data 102 up to 1000 kBm, but if the transmit rate of data 102 exceeds the refresh rate of 100 kBm, the transmit rate of data 102 will shortly be limited to 100 kBm once the 1000 kB in token bucket 250 is used up.

In general, the maximum total bucket size (i.e. a suitable allowable data burst) can be determined from a total capacity of network 105 optionally combined with a probability of reaching a total network capacity (e.g. if all devices on network 105 were to simultaneously burst the maximum total bucket size). Further, refresh rates for devices can be determined from data usage associated with network 105, including but not limited to average traffic parameters associated with network 105 divided by the number of devices on network 105, however any other suitable type of data usage parameter is within the scope of present implementations. For example, other data usage parameters other than average data usage are within the scope of present implementations.

In any event, token parameters can be distributed to the respective application token buckets 252 to throttle data 102 from each application 242, for example by processing application 236. In other words, when token bucket 250 is provided with token parameters 122, processor 208 distributes token parameters 122 to token buckets 252 upon processing application 236.

Figure 4:
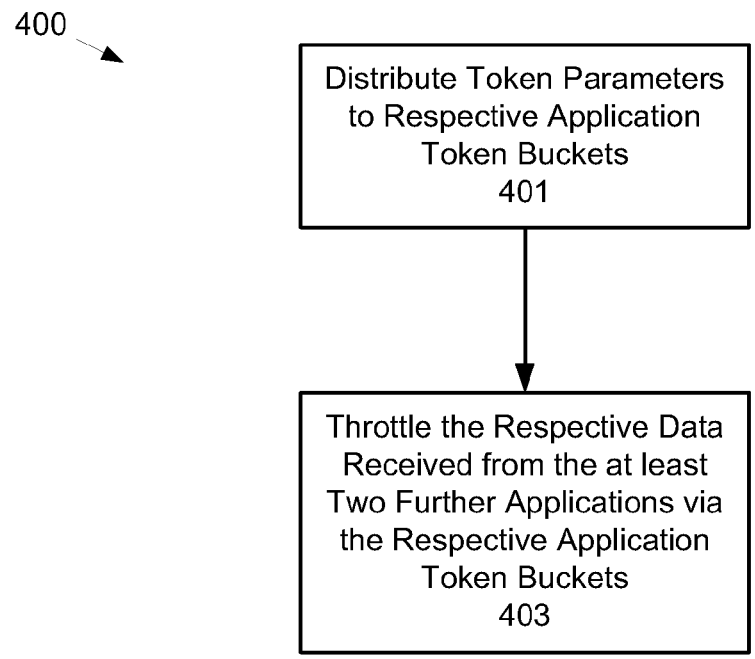
FIG. 4 depicts a method for throttling transmitted data at a communication device, according to non-limiting implementations.

For example, the aggregate token bucket size and refresh rate are distributed between token buckets 252. As such, attention is now directed to FIG. 4 which depicts a method 400 for enabling access of a first mobile electronic device to at least one network accessible by a second mobile electronic device. In order to assist in the explanation of method 400, it will be assumed that method 400 is performed using system 100. Furthermore, the following discussion of method 400 will lead to a further understanding of system 100 and its various components. However, it is to be understood that system 100 and/or method 400 can be varied, and need not work exactly as discussed herein in conjunction with each other, and that such variations are within the scope of present implementations. It is appreciated that method 400 can be specifically implemented in system 100 by device 101 processing application 236.

It is appreciated that method 400 assumes that token parameters 122 have been received at aggregate token bucket 250 as described above.

At block 401, token parameters 122 of aggregate token bucket 250 are distributed to respective application token buckets 252 associated with at least two further applications 242, the communication application 240 enabled to receive respective data 102 from the at least two further applications 242 for transmission to network 105 via the communication interface 228.

At block 403, respective data 102 received from the at least two further applications 242 is throttled via the respective application token buckets 252.

Figure 5:
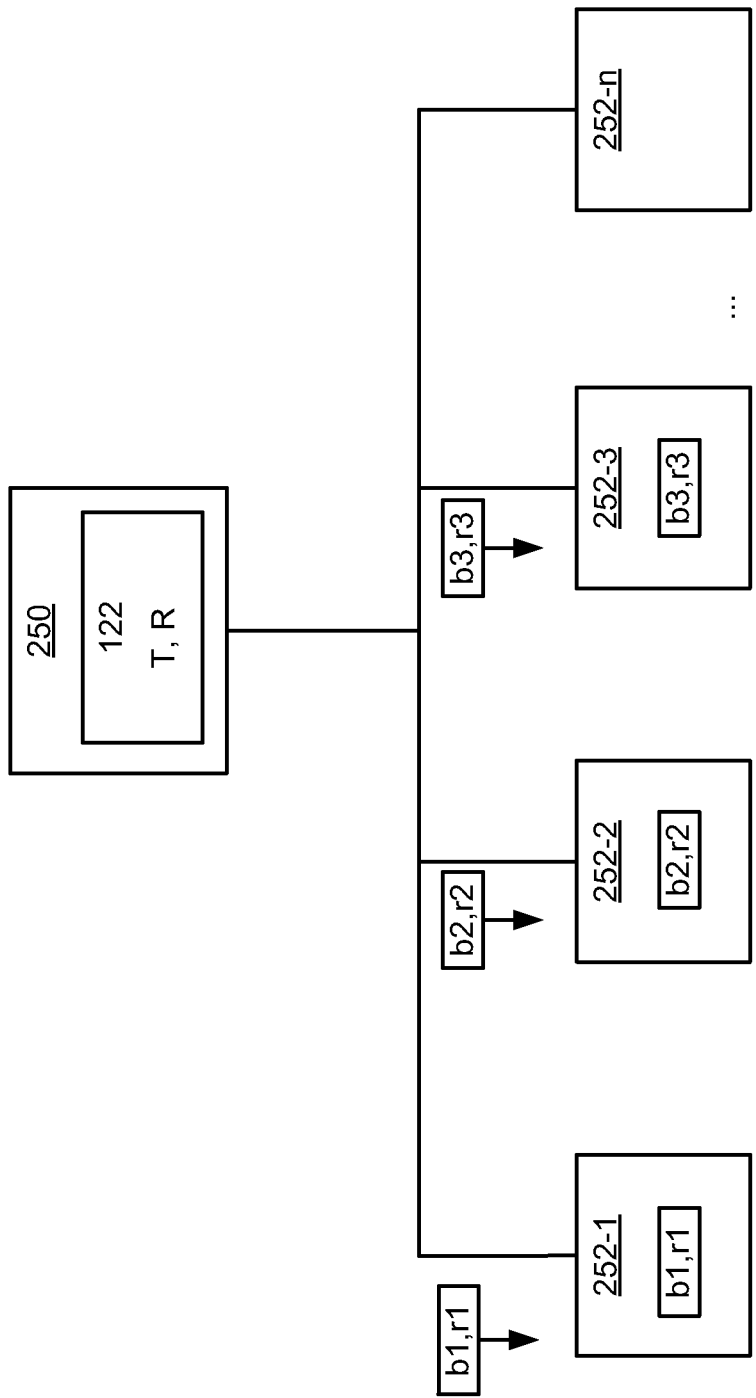
FIG. 5 depicts distribution of token parameters among the token buckets of the communication device of FIG. 2, according to non-limiting implementations.
Figure 6:
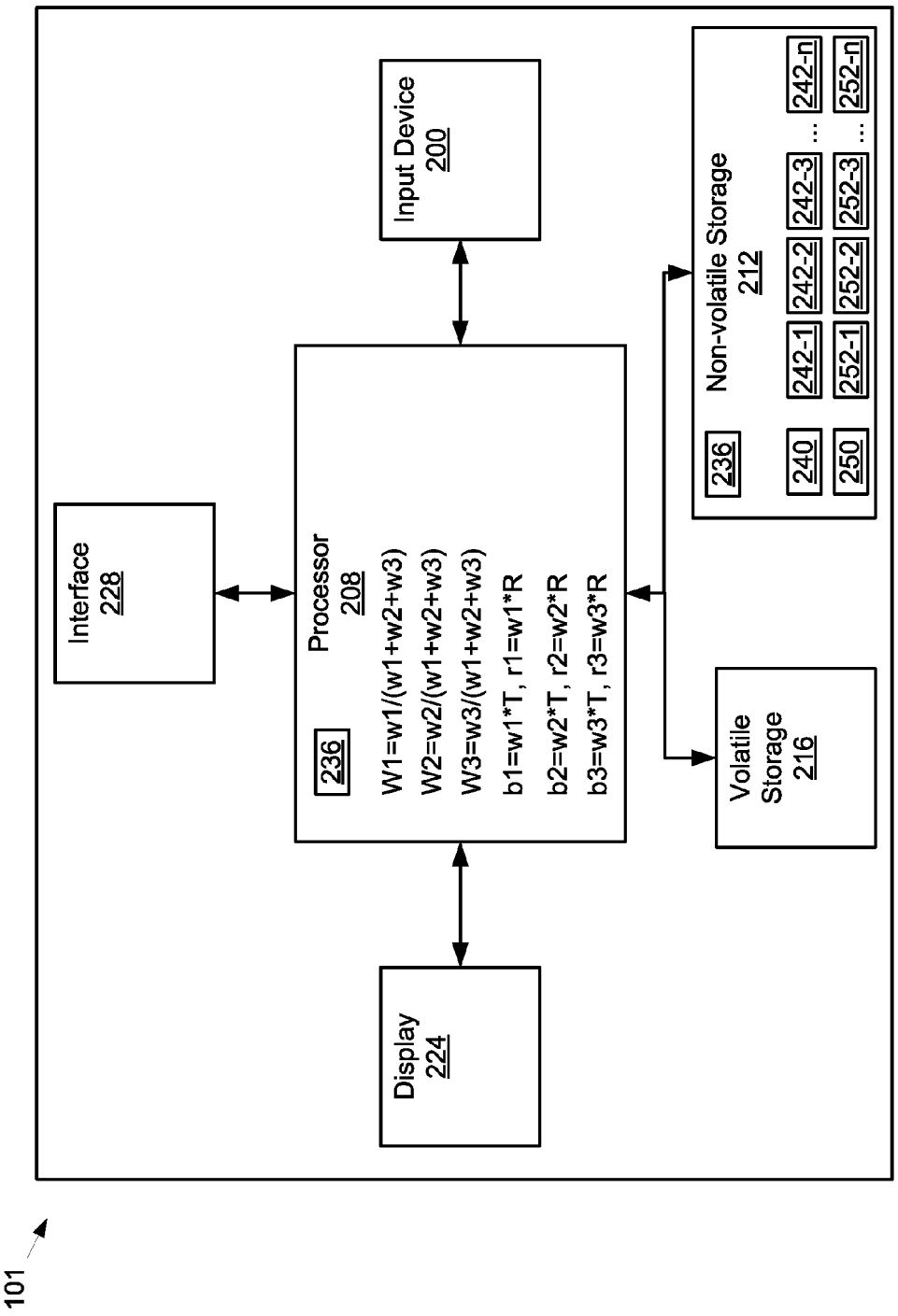
FIG. 6 depicts the communication device of FIG. 2 determining token bucket parameter distribution, according to non-limiting implementations.

For example, attentions is directed to FIG. 5 which depicts a schematic diagram of aggregate token bucket 250 and application token buckets 252. Token parameters 122 comprise a maximum aggregate token bucket size, T, and refresh rate R. Each of TB size T and refresh rate R is distributed between token buckets 252 by distributing each of TB size T and refresh rate R into portions, for example respective TB sizes b1, b2, b3 ... bn, and respective refresh rates r1, r2, r3 ... rn, where the sum of all the respective TB sizes b1, b2, b3 ... bn add up to TB size T, and the sum of all the respective refresh rates r1, r2, r3 ... rn add up to refresh rate R.

Further, it is generally appreciated that, in some implementations, token parameters 122 are distributed between token buckets 252 associated with active applications 242. As such, in FIG. 5, it is assumed that applications 242-1, 242-2, 242-3 are activated as in FIG. 4, and hence TB size T and refresh rate R is distributed among associated token buckets 252-1, 252-2. 252-3 via respective token bucket sizes b1, b2, b3 and respective refresh rates r1, r2, r3. Hence, application 242-1 is throttled to TB size b1 and refresh rate r1 via token bucket 252-1, application 242-2 is throttled to TB size b2 and refresh rate r2 via token bucket 252-2, and application 242-3 is throttled to TB size b3 and refresh rate r3 r2 via token bucket 252-3. Further, b1+b2+b3=T, and r1+r2+r3=R.

In other words, in these implementations, token parameters 122 comprise: a maximum token bucket size T for controlling bursts of data 102; and a refresh rate, R wherein respective maximum token buckets sizes b and respective refresh rates r are determined for each of the respective application token buckets 252 such that a respective maximum token bucket size sum equals the maximum token bucket size, and a respective refresh rate sum equals the refresh rate. However, in some implementations, a respective maximum token bucket size sum can be approximately the maximum token bucket size, and a respective refresh rate sum can be approximately the refresh rate. For example, the respective maximum token bucket size sum can be within a first given range and/or a first given percentage of the maximum token bucket size, and a respective refresh rate sum can be within a second given range and/or a second given percentage the refresh rate.

It is further appreciated that no token parameters 122 are distributed to other token buckets 252, such as token bucket 252-n.

However, in other implementations, token parameters 122 can be distributed between token buckets 252 associated with both active applications 242 and at least one inactive application 242. For example token parameters 122 can be distributed to a token bucket associated with an inactive application 242 whose probability of being activated within a given time period is above a threshold value, the probability of being activated based on historical usage or any other suitable method; when the inactive application 242 does not become inactive within the given time period, token parameters 122 can be redistributed among token buckets 252 associated with active applications 242. In further implementations, a probability factor can be used to determine token parameters 122 for aggregate TB based on historical usage data of any and/or all applications 242 during a given time period; in some implementations, token parameters 122 of the aggregate TB can then be redistributed among active applications 242 during the same given time period.

While any suitable method for distributing each of TB size T and refresh rate R into portions is within the scope of present implementations, in some non-limiting implementations, the distribution is performed via weights associated with each application 242. For example, each application 242-1, 242-2, 242-3 ... 242-n can be associated with respective weights W1, W2, W3 ... $W_n$. For example, weights W can be determined from data rates associated with each active application 242. Data rates w1, w2, w3 ... $w_n$ in any suitable manner including but not limited to being determined from one or more of a data rate associated with each application 242, an application developer requested data rate associated with each application 242, historical data rates associated with each application 242, test data rates associated with each application 242 and the like.

In some implementations, when each application 242 is installed, a data rate parameter can be provided as part of the installation data received from an applications server (not depicted). When an application 242 is upgraded, the data rate associated with the application 242 can change via update data received from an update server (not depicted) and/or an applications server.

An application developer requested data rate associated with each application 242 can be determined by receiving data from a developer of a given application 242 indicating a preferred data rate at which the given application 242 will optimally perform.

An historical data rate of a given application 242 can be determined by storing data rates that the given application 242 uses when active and determining an average historical data rate there from.

A test data rate of a given application 242 can be determined from test data associated with the given application 242 to determine a data rate at which the given application will optimally perform.

It is further appreciated that one or more data rates w1, w2, w3 ... $w_n$ can be received along with token parameters 122, and/or from any other suitable remote computing device.

In any event, once data rates w1, w2, w3 ... wn associated with each application 242 are determined, device 101 (e.g. via processor 208) can determine respective weights associated with each of the respective application token buckets 252 such that token parameters 122 associated with aggregate token bucket 250 are distributed to each of the respective application token buckets 252 according to the respective weights. In other words, each of the respective weights are determined from respective data rates associated with each of active applications 242.

W1=w1/(w1+w2+w3);
W2=w2/(w1+w2+w3); and
W3=w3/(w1+w2+w3).

Hence, each application token bucket size b1, b2, b3 can be determined by multiplying the aggregate TB size T by the respective weight w1, w2, w3. Similarly, each application refresh rate r1, r2, r3 can be determined by multiplying the aggregate refresh rate R by the respective weight w1, w2, w3.

Hence, for each active application 242-1, 242-2, 242-3:
b1=w1*T, r1=w1*R;
b2=w2*T, r2=w2*R; and
b3=w3*T, r3=w3*R.

Once these (b,r) values are distributed to token buckets 252-1, 252-2, 252-3 of active applications 242-1, 242-2, 242-3, and token buckets 252-1, 252-2, 252-3 then cause data 102-1, 102-2, 102-3 to be throttled from active applications 242-1, 242-2, 242-3.

It is yet further appreciated that method 400 can be repeated to redistribute token parameters 122 among the respective application token buckets 252 associated with active applications 242 when at least one of: one or more of applications 242 becomes inactive; and one or more of applications 242 become active. Hence, data 102 from each active application 242 is throttled accordingly.

It is yet further appreciated that at least one of applications 242 can remain unthrottled. For example, in implementations where one more of applications 242 can comprise an application associated with application 240 (such as application 242-1 comprising an application for generating message data and/or chat data while application 240 can comprise an associated client for transmitting data generated by application 242-1), the one or more applications 242 associated with application 240 can remain unthrottled. Using application 242-1 as a non-limiting example, token bucket 250 can be used to throttle data for applications 242, except for data 102-1 originating from application 242-1. Hence, data 102-1 is not throttled, and further there are no application token buckets 252-1 associated therewith. Hence, token parameters 122 are distributed only between application token buckets 252-2 ... 252-n, to throttle associated applications 242-2 ... 242-n. Furthermore, in some of these implementations, data 102 from the unthrottled application 242 can be assigned transmission priority. In this way, data 102 from an application 242 associated with communications application 242 can be unaffected by throttling, and further third party applications using communications application 240 to transmit data can be throttled and/or controlled.

Figure 7:
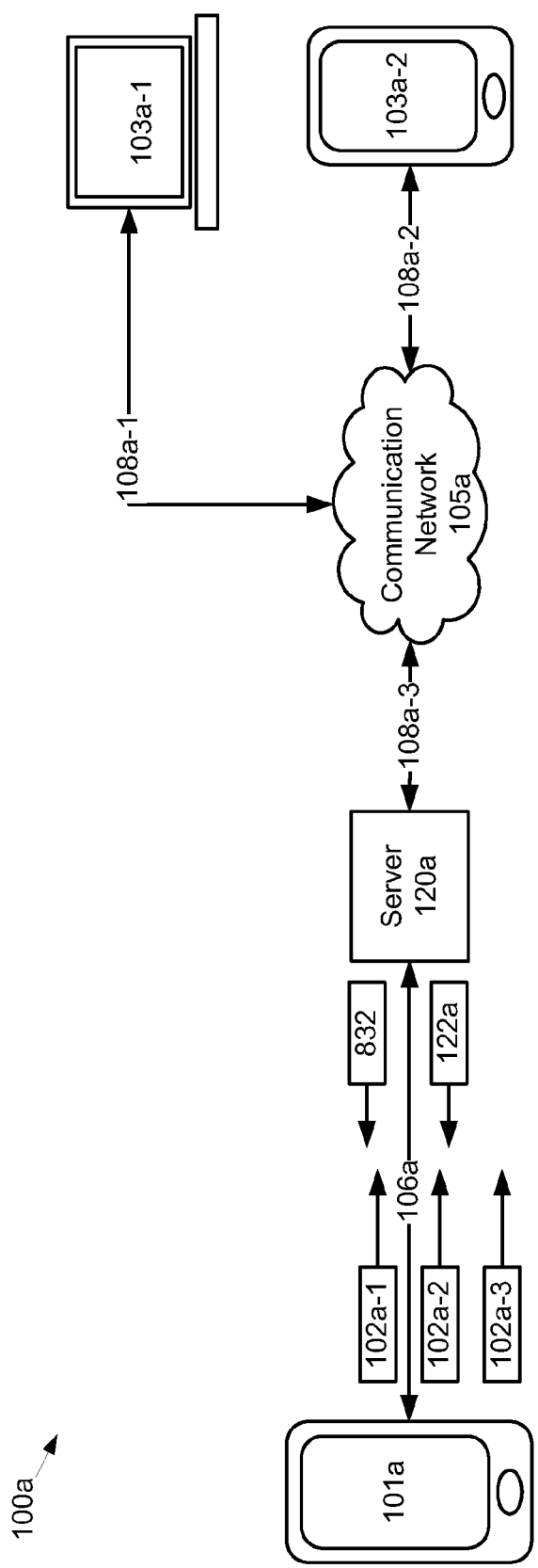
FIG. 7 depicts a system for throttling transmitted data at a communication device, according to non-limiting implementations.
Figure 8:
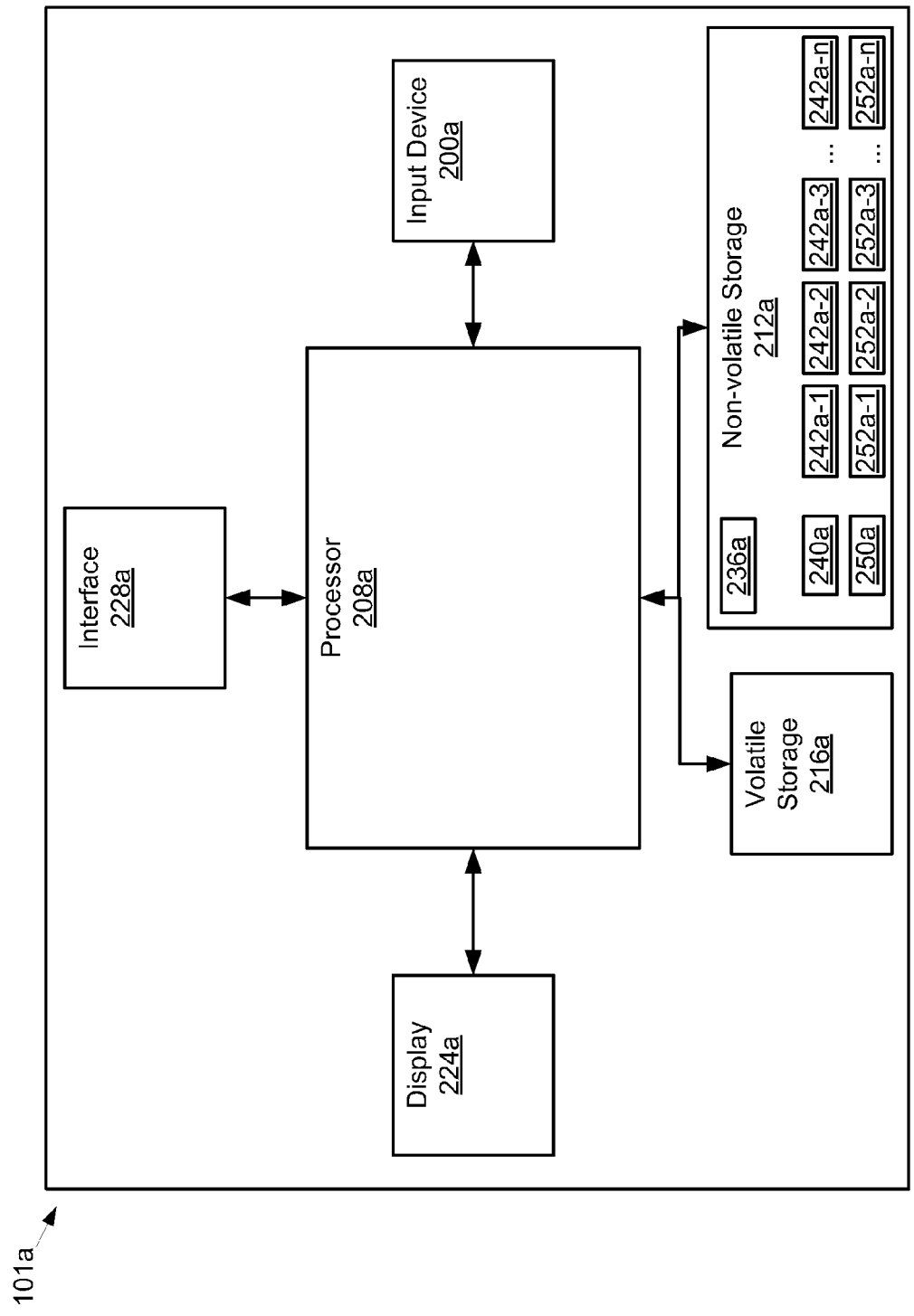
FIG. 8 depicts a communication device for throttling transmitted data, according to non-limiting implementations.

Attention is now directed to FIGS. 7 and 8, which are substantially similar to respectively FIGS. 1 and 2, with like elements having like numbers, however with an "a" appended thereto. However, with reference to FIG. 7, which depicts a system 100a, in these implementations, server 120a is further enabled as a communications server. In some implementations server 120a can be associated with communication application 240a such that all communications between communication application 240a data and other devices 103a pass through server 120a. For example, while in FIG. 7, server 120a is depicted as in communication with network 105a, in other implementations, server 120a can be an element of network 105a such that data 102a received from application 240a is routed to server 120a before being transmitted by server 120a to a respective device 103a. It is further appreciated that otherwise server 120a can be similar to server 120.

In any event, server 120a is generally enabled to determine scaling data 832 by analyzing traffic there through to determine loads on server 120a and/or any associated network, such as network 105a, as well as transmit scaling data 832 to device 101a to periodically scale token parameters 122a of token bucket 250a. In turn, scaled token parameters can be distributed to application token buckets 252 as described above. It is appreciated that scaling data 832 can be transmitted periodically and/or on demand and/or as loads on server 120a and/or an associated network change.

For example, server 120a can determine time of day network usage probabilities which can be normalized and thereafter provided as a table in scaling data 832. For example, in some implementations, an average network usage can be determined by averaging network usage over a given time period and/or by determining a sample period mean. Further, network usage can be provided for predetermined units of time, such as every hour. Hourly network usage can then be scaled by dividing the hourly network usage by the average network usage, such that a value of a normalized network usage probability of "1" indicates that network usage is average at a given hour. Similarly, a normalized network usage probability of "1.1" indicates that network usage is 10% above average at another given hour. Hence, for example, scaling data 832 can comprise a table of normalized network usage probabilities, each of which can be used as scaling factor for token parameters 122a. an example portion of scaling data 832 is depicted in Table 1:

TABLE 1

| Time | Scaling Factor |
|---|---|
| Tuesday | |
| 20:00 | 1.2 |
| 21:00 | 1.1 |
| 22:00 | 1.0 |
| 23:00 | 1.0 |
| 24:00 | 0.9 |
| Wednesday | |
| 00:00 | 0.8 |
| 01:00 | 0.7 |

While Table 1 is arranged in rows and columns, in other implementations scaling data 832 can comprise any suitable format. Further, in these implementations, scaling data 832 comprises hourly times (e.g. 20:00, 21:00, etc.) for given days (e.g. Tuesday and Wednesday) and scaling factors associated with each hour, the scaling factors determined as described above.

Figure 9:
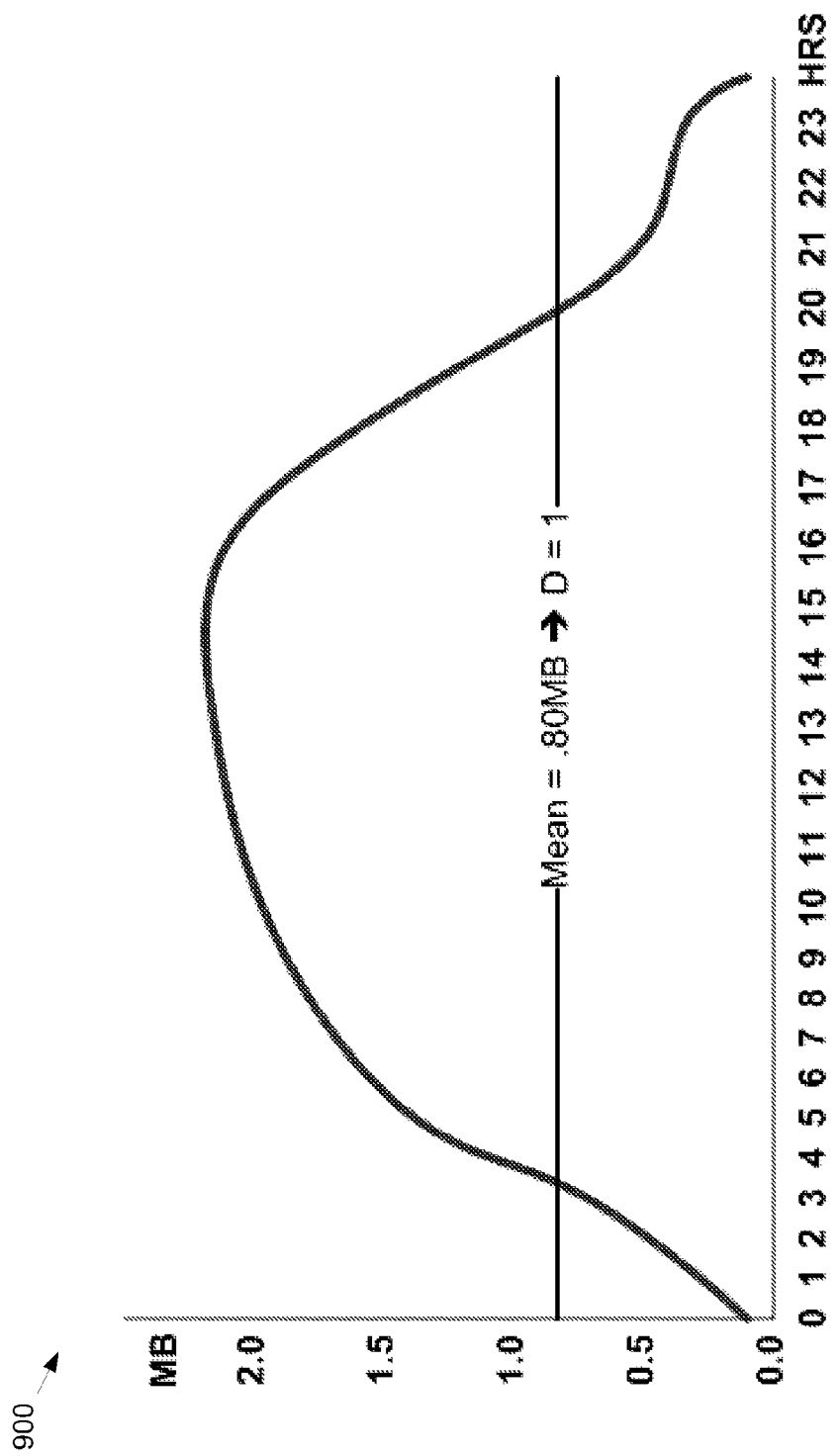
FIG. 9 depicts a graph of network load over a given time period, according to non-limiting implementations.
Figure 10:
FIG. 10 depicts a table of scaling factors, according to non-limiting implementations.

A non-limiting example of determining a mean of network load/usage is provided in FIG. 9, which depicts a graph 900 of network load over a 24 hour period, with a mean usage of 0.80 MB, which is normalized to D="1", D being a time of day (TOD) scaling factor. However, it is appreciated that the TOD scaling factor, D, could be normalized to any other suitable scaling factor other than "1", and further could be based on any suitable time period, other than a 24 hour period. Another example, of scaling data 832 is provided in FIG. 10, which depicts a table 1000 of scaling factors D (e.g. for Monday: D0mon, D1mon . . . etc.) arranged by rows corresponding to days of the week and columns corresponding to hours of the day.

A method 1100 of determining TOD distribution/scaling factors D is depicted in FIG. 11: Hourly usage data is collected for the global population of devices on network 105 implementing communications application 240a and third party application usage (i.e. applications 242a). Mean usage is determined for given sample periods (e.g. over a day, week, month). D=1 is set as the mean usage value and a D value is calculated for each hourly interval. For example, with reference to FIG. 9, when the Sample Period Mean=0.80 MB, D=1. Then, if the calculated mean usage at hour "2Mon"=1.60 MB, then D2Mon in table 1000 1.60/0.80=2.0. In other words, in these implementations scaling data 832 is based on historical network usage. Again, however, it is appreciated that D could be normalized to any other suitable scaling factor other than "1", and further could be based on any suitable time period, other than a 24 hour period, and that the above calculation is provided as an example only, and not to be considered unduly limiting.

In any event, once scaling data 832 is received, token parameters 122a are scaled periodically according to scaling data 832 as will be described hereafter. For example, if T, R are the aggregate token bucket sizes and refresh rates as described above, then each of T, R can be scaled hourly using the TOD distribution factor D for that hour:

Ta=T*D; and
Ra=R*D.

Further, the token bucket size ba (corresponding to token bucket size b described above) and refresh rate ra (corresponding to refresh rate r described above) for each application 242a can be determined from:

ba=W*Ta
ra=W*Ra, where "W" is the weight for each respective application described above.

Furthermore, using Table 1, or method 1100, or any other suitable scaling data 832, at 1 hr intervals, processor 208a, via processing of application 236a, recalculates aggregate TB size Ba, and token refresh rate Ra using D values for that hour.

Furthermore, in these implementations, data for each respective application 242a can be collected. For example, data collection counters can be set to zero each hour and data collected for each respective application 242a and transmitted to server 120a, either periodically, e.g. hourly, or at any other suitable time. For example, such collected data can be transmitted to server 120a as part of a parameter change request to change ToD D scaling factors/parameters.

Furthermore, it is appreciated that as applications 242a become active or inactive, token parameters 122a are redistributed as described above.

It is further appreciated that a plurality of communication devices, similar to device 101a, scaling data 832 can either be the same for all devices interacting with server 120a and/or network 105a. In other words, server 120a can be enabled to provide communications and/or analysis for the plurality of communication devices, including device 101a, and determine scaling data for each of the plurality of communication devices and transmit scaling data to each of the plurality of communication devices. In some of these implementations, scaling data transmitted to all of the plurality of communication devices can be the same scaling data, such as scaling data 832 such that transmitted data is similarly scaled for each of the plurality of communication devices. However, in other implementations, scaling data can be specific to one or more of the plurality of the communication device such that transmission of data at the one or more of the plurality of communication devices is scaled independent of the others of the plurality of communication devices. Hence, transmission of data 102a from device 101a can be controlled independently of any other devices using network 105a and/or server 120a. For example, consider that device 101a is associated with a rogue user who has caused one or more of applications 240a, 242a to transmit large amounts of data 102a such that a larger than allotted amount of bandwidth of network 105a is being used by device 101a. Server 120a can determine that device 101a is transmitting large amounts of data 102a and transmit scaling data 832 to device 101a comprising scaling values (i.e. TOD D scaling factors/parameters) that cause the amount of data 102a to be transmitted to be severely throttled, such as TOD D scaling factors of approximately 0.1-0.3, or any other suitable scaling factors.

It is yet further appreciated that scaling data 832 can include weighting data for a given application 242a to cause the given application 242a to be throttled in a specific manner. For example, consider when the given application 242a is upgraded and bandwidth usage is thereby increased, that can be larger than an acceptable threshold value. To address this problem, at least one set of respective token parameters associated with a respective application token bucket 252a is adjusted according to respective scaling parameters received from a remote computing device such as server 120a, such that transmission of data 102 is throttled to acceptable levels and/or to punitive levels.

Figure 12:
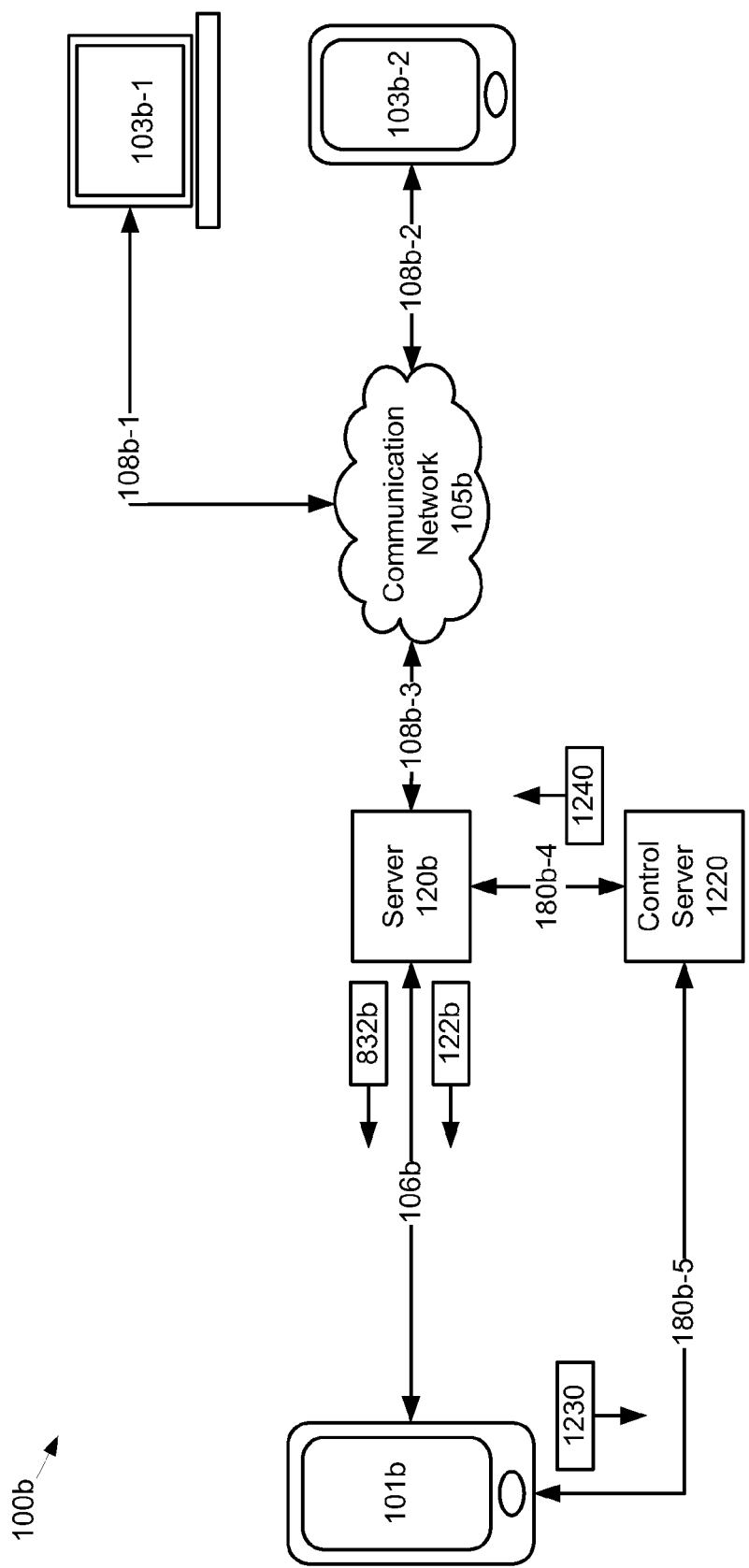
FIG. 12 depicts a system for throttling transmitted data at a communication device, according to non-limiting implementations.
Figure 13:
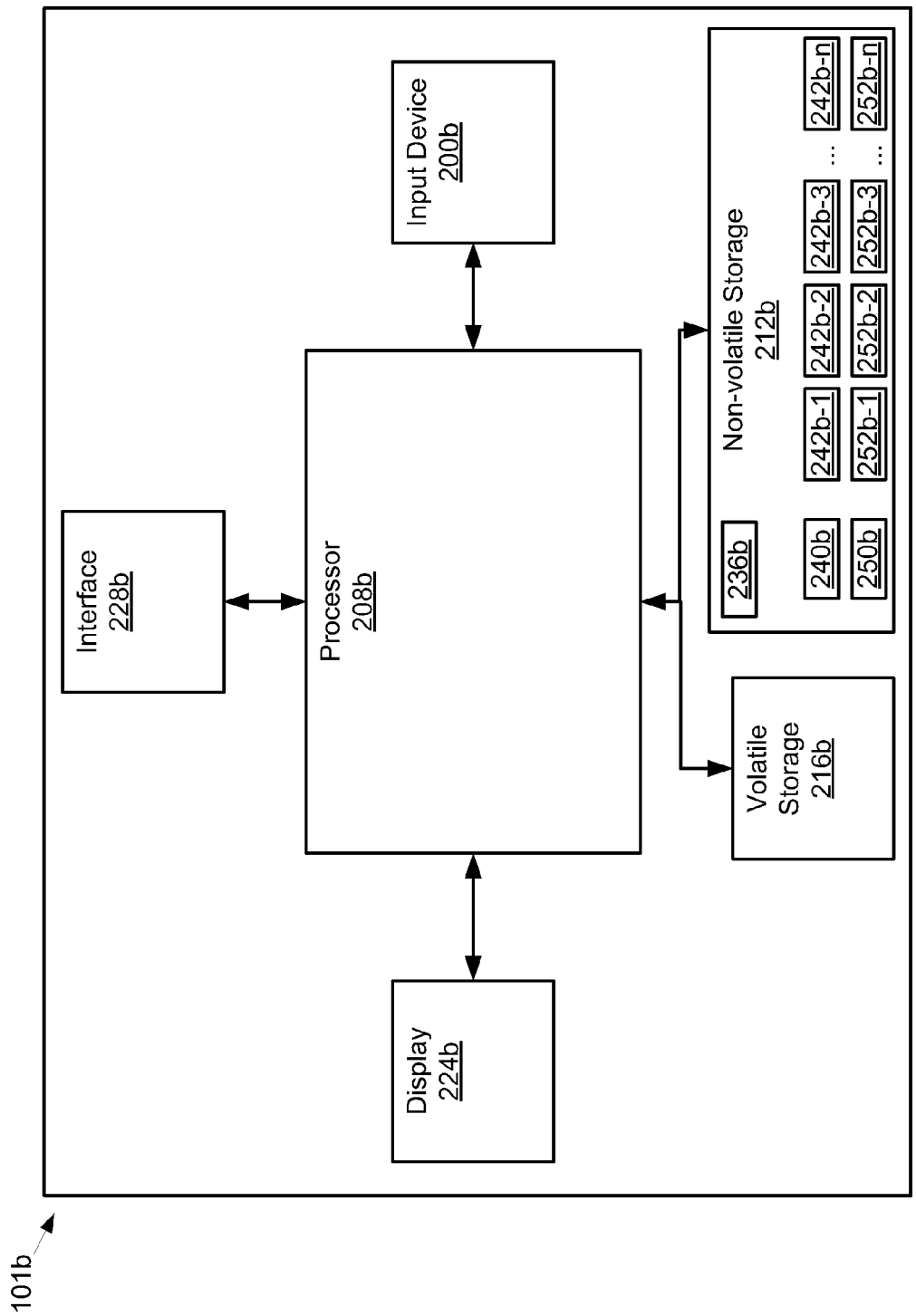
FIG. 13 depicts a communication device for throttling transmitted data, according to non-limiting implementations.

Attention is now directed to FIGS. 12 and 13 which are similar to FIGS. 7 and 8 respectively, with like elements having like numbers with a "b" appended thereto rather than an "a". However system 100b further comprises a control server 1220 in communication with server 120b via a link 108b-4 and in communication with device 101b via a link 108b-5, each of links 108b-4 and 108b-5 being similar or different to other links 108 and/or link 106b. It is further appreciated that server 1220 can be similar to server 120b, but enabled to analyze statistics received from device 101b and trigger server 120b to transmit data 832b to device 101b. In any event, in these implementations, processor 208b of device 101b is further enabled to collect statistics on data usage and/or transmission by applications 242 and transmit a statistics log 1230 to control server 1220 periodically (e.g. once every 24 hours) and/or at any other suitable time. It is furthermore appreciated that data collection at device 101b for log 1230 can be implemented on a periodic basis; for example, statistics can be collected for data usage/transmission on an hourly basis. Log 1230 can be processed by server 1220 and when it is determined that scaling data 832b should be updated at device 101b, server 1220 transmit a parameter change request 1240 to server 120b to cause/trigger server 120b to transmit scaling data 832b. In this manner, scaling data 832b can be updated based on data usage by applications 242b at device 101b.

Those skilled in the art will appreciate that in some implementations, the functionality of devices 101, 101a, 101b, server 120, 120a, 120b, and control server 1220 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 101a, 101b, server 120, 120a, 120b, and control server 1220 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A communication device comprising:
a processor, and a communication interface, the processor to:
process a communication application that transmits data via the communications interface, the communication application comprising a messaging application;
process at least two further applications having limited or no messaging functionality, the communication application enabled to receive respective data from the at least two further applications for transmission to a network via the communication interface, the at least two further applications comprising respective multimedia applications;
distribute token parameters of an aggregate token bucket, associated with the communication application, to respective application token buckets associated with the at least two further applications;
throttle the respective data received at the communication application for transmission from the at least two further applications via the respective application token buckets; and,
determine respective weights associated with each of the respective application token buckets, such that the token parameters associated with the aggregate token bucket are distributed to each of the respective application token buckets according to the respective weights, the respective weights determined from one or more of a data rate associated with each of the at least two further applications, an application developer requested data rate associated with each of the at least two further applications, historical data rates associated with of the at least two further applications, and test data rates associated with each of the at least two further applications.

2. The computing device of claim 1, wherein each of the respective weights are determined from respective data rates associated with each of the at least two further applications.

3. The computing device of claim 1, wherein the processor is further to redistribute the distribute token parameters among the respective application token buckets associated with active applications when at least one of:
one or more of the at least two further applications becomes inactive; and one or more additional further applications become active.

4. The computing device of claim 1, where the token parameters comprise:
a maximum token bucket size for controlling bursts of the data; and a refresh rate,
wherein respective maximum token buckets sizes and respective refresh rates are determined for each of the respective application token buckets such that a respective application token bucket size sum is approximately the aggregate token bucket size, and a respective application refresh rate sum is approximately the aggregate refresh rate.

5. The computing device of claim 1, wherein the token bucket parameters are scaled periodically according to scaling data received from a remote computing device.

6. The computing device of claim 5, wherein the scaling data comprises time of day network usage probabilities.

7. The computing device of claim 5, wherein the scaling data is based on historical network usage.

8. The computing device of claim 5, wherein the scaling data is one of:

for a plurality of communication devices, including the communication device, such that transmitted data is similarly scaled for each of the plurality of devices; and, specific to the communication device such that transmission of the data at the communication device is scaled independent of the other of the plurality of devices.

9. The computing device of claim 1, wherein at least one set of respective token parameters associated with a respective application token bucket is adjusted according to respective scaling parameters received from a remote computing device.

10. A method comprising:

processing, at a processor of a computing device, a communication application that transmits data via a communications interface of the computing device, the communication application comprising a messaging application;

processing, at the processor, at least two further applications having limited or no messaging functionality, the communication application enabled to receive respective data from the at least two further applications for transmission to a network via the communication interface, the at least two further applications comprising respective multimedia applications;

distributing, at the processor, token parameters of an aggregate token bucket, associated with the communication application, to respective application token buckets associated with the at least two further applications;

throttling, at the processor, the respective data received at the communication application for transmission from the at least two further applications via the respective application token buckets; and, determining respective weights associated with each of the respective application token buckets, such that the token parameters associated with the aggregate token bucket are distributed to each of the respective application token buckets according to the respective weights, the respective weights determined from one or more of a data rate associated with each of the at least two further applications, an application developer requested data rate associated with each of the at least two further applications, historical data rates associated with of the at least two further applications, and test data rates associated with each of the at least two further applications.

11. The method of claim 10, wherein each of the respective weights are determined from respective data rates associated with each of the at least two further applications.

12. The method of claim 10, further comprising redistributing, at the processor, the distribute token parameters among the respective application token buckets associated with active applications when at least one of:

one or more of the at least two further applications becomes inactive; and one or more additional further applications become active.

13. The method of claim 10, where the token parameters comprise:

a maximum token bucket size for controlling bursts of the data; and a refresh rate, wherein respective maximum token buckets sizes and respective refresh rates are determined for each of the respective application token buckets such that a respective maximum token bucket size sum is approximately the maximum token bucket size, and a respective refresh rate sum is approximately the refresh rate.

14. The method of claim 10, wherein the token bucket parameters are scaled periodically according to scaling data received from a remote computing device.

15. The method of claim 14, wherein the scaling data comprises time of day network usage probabilities.

16. The method of claim 14, wherein the scaling data is based on historical network usage.

17. The method of claim 14, wherein the scaling data is one of:

for a plurality of communication devices, including the communication device, such that transmitted data is similarly scaled for each of the plurality of devices; and, specific to the communication device such that transmission of the data at the communication device is scaled independent of the other of the plurality of devices.

18. The method of claim 10, wherein at least one set of respective token parameters associated with a respective application token bucket is adjusted according to respective scaling parameters received from a remote computing device.

19. A computer program product, comprising a non-transitory computer usable medium having a computer readable program code executed by a processor to implement a method comprising:

processing, at the processor of a computing device, a communication application that transmits data via a communications interface of the computing device, the communication application comprising a messaging application;

processing, at the processor, at least two further applications having limited or no messaging functionality, the communication application enabled to receive respective data from the at least two further applications for transmission to a network via the communication interface, the at least two further applications comprising respective multimedia applications;

distributing, at the processor, token parameters of an aggregate token bucket, associated with the communication application, to respective application token buckets associated with the at least two further applications;

throttling, at the processor, the respective data received from the at least two further applications via the respective application token buckets; and, determining respective weights associated with each of the respective application token buckets, such that the token parameters associated with the aggregate token bucket are distributed to each of the respective application token buckets according to the respective weights, the respective weights determined from one or more of a data rate associated with each of the at least two further applications, an application developer requested data rate associated with each of the at least two further applications, historical data rates associated with of the at least two further applications, and test data rates associated with each of the at least two further applications.

* * * * *

UNITED STATES PATENT AND TRADEMARK OFFICE
CERTIFICATE OF CORRECTION

PATENT NO. : 9,100,448 B2
APPLICATION NO. : 13/355300
DATED : August 4, 2015
INVENTOR(S) : Wael Midani, Ling Zou and Marcel Villaflor It is certified that error appears in the above-identified patent and that said Letters Patent is hereby corrected as shown below:

Title Page, Column 1, item (75) (Inventors), Line 3, Delete "Kotonah, NY" and insert
-- Katonah, NY --, therefor.

In the Claims

Column 14, Line 38, In Claim 2, Delete "computing device" and insert -- communication device --, therefor.

Column 14, Line 41, In Claim 3, Delete "computing device" and insert -- communication device --, therefor.

Column 14, Line 48, In Claim 4, Delete "computing device" and insert -- communication device --, therefor.

Column 14, Line 59, In Claim 5, Delete "computing device" and insert -- communication device --, therefor.

Column 14, Line 62, In Claim 6, Delete "computing device" and insert -- communication device --, therefor.

Column 14, Line 64, In Claim 7, Delete "computing device" and insert -- communication device --, therefor.

Column 14, Line 66, In Claim 8, Delete "computing device" and insert -- communication device --, therefor.

Column 15, Line 7, In Claim 9, Delete "computing device" and insert -- communication device --, therefor.

Signed and Sealed this
Twelfth Day of April, 2016

Michelle K. Lee
*Director of the United States Patent and Trademark Office*